United States Patent
Eimer et al.

(10) Patent No.: US 6,200,365 B1
(45) Date of Patent: Mar. 13, 2001

(54) DEVICE AND METHOD FOR CONTINUOUSLY FRACTIONATING A GAS BY ADSORPTION AND IN-SERVICE TESTING DEVICE

(75) Inventors: Klaus Eimer, Ratingen; Hans-Michael Schuster, Haan; Dieter Patzig, Ratingen; Matthias Behrendt, Essen, all of (DE)

(73) Assignee: Ultrafilter International AG, Haan (DE)

( * ) Notice: Subject to any disclaimer, the term of this patent is extended or adjusted under 35 U.S.C. 154(b) by 0 days.

(21) Appl. No.: 09/302,653

(22) Filed: Apr. 30, 1999

Related U.S. Application Data

(63) Continuation of application No. PCT/EP97/05965, filed on Oct. 29, 1997.

(30) Foreign Application Priority Data

Oct. 31, 1996 (DE) .............................................. 196 45 007
Feb. 28, 1997 (DE) .............................................. 197 10 305

(51) Int. Cl.$^7$ ................................................ B01D 53/047
(52) U.S. Cl. .................................... 95/19; 95/23; 95/117; 95/112; 96/109; 96/113; 96/117; 96/130; 96/144
(58) Field of Search .............................. 95/8, 10, 11, 19, 95/21, 117, 121, 122; 96/108, 109, 111, 113–115, 121, 130–133, 144

(56) References Cited

U.S. PATENT DOCUMENTS

| | | | |
|---|---|---|---|
| 1,887,589 | * 11/1932 | Farmer | 96/113 |
| 3,258,899 | * 7/1966 | Coffin | 96/130 X |
| 3,323,292 | * 6/1967 | Brown | 96/130 X |
| 3,324,631 | * 6/1967 | Kreuter | 96/130 X |
| 3,775,946 | * 12/1973 | Brazzel | 96/113 X |
| 3,876,400 | * 4/1975 | Frantz | 96/113 |
| 4,101,298 | * 7/1978 | Myers et al. | 96/114 |
| 4,108,617 | * 8/1978 | Frantz | 96/114 |
| 4,197,095 | * 4/1980 | White, Jr. et al. | 96/113 X |
| 4,373,938 | * 2/1983 | McCombs | 96/130 X |
| 4,512,781 | * 4/1985 | Caralli et al. | 96/113 X |
| 4,537,607 | * 8/1985 | Rogers et al. | 96/113 |
| 4,546,442 | * 10/1985 | Tinker | 96/114 |
| 4,584,001 | * 4/1986 | Dechene | 96/114 |
| 4,631,073 | * 12/1986 | Null et al. | 96/109 X |

(List continued on next page.)

FOREIGN PATENT DOCUMENTS

3210030 * 9/1983 (DE) ........................................ 96/114

*Primary Examiner*—Robert H. Spitzer
(74) *Attorney, Agent, or Firm*—Herbert L. Lerner; Laurence A. Greenberg; Werner H. Stemer

(57) ABSTRACT

A device for continuously fractionating a gas by adsorption, an in-service testing device in a processor-controlled adsorption drier system and a method for testing the operating capability of an adsorption drier system under the control of a processor, including two adsorbent beds connected to one another in a switching system, in which regeneration is performed by a flow of regeneration gas. The device has a gas inlet, a gas outlet and a bypass outlet feeding into a common functional block, which contains a line switching circuit, a first and a second shuttle valve and, optionally, other components. The in-service testing device and the device are so compact due to their respective structures that they can be integrated with one another requiring little space and having low assembly requirements. The testing method is configured to co-operate with the in-service testing device and the device, requiring only a few components for the application thereof. Furthermore, since it needs only a few components, the method has very few requirements in terms of manufacture and space.

46 Claims, 3 Drawing Sheets

U.S. PATENT DOCUMENTS

| | | | |
|---|---|---|---|
| 4,816,043 | * | 3/1989 | Harrison .............................. 96/115 X |
| 4,877,429 | * | 10/1989 | Hunter ................................ 96/130 X |
| 5,344,474 | * | 9/1994 | Null .................................... 96/133 X |
| 5,549,736 | * | 8/1996 | Coffield et al. ........................ 96/133 |
| 5,578,115 | * | 11/1996 | Cole .................................... 96/130 X |
| 5,662,727 | * | 9/1997 | Castle et al. ......................... 96/130 X |
| 5,766,310 | * | 6/1998 | Cramer ............................... 96/111 X |
| 5,827,354 | * | 10/1998 | Krabiell et al. ..................... 96/133 X |

* cited by examiner

DEVICE AND METHOD FOR CONTINUOUSLY FRACTIONATING A GAS BY ADSORPTION AND IN-SERVICE TESTING DEVICE

CROSS-REFERENCE TO RELATED APPLICATION

This application is a continuation of copending International Application No. PCT/EP97/05965, filed Oct. 29, 1997, which designated the United States.

BACKGROUND OF THE INVENTION

Field of the Invention

The invention relates to a device for continuously fractionating a gas by adsorption, a method for continuous adsorption fractionation with processor-controlled testing of an operating capability of an adsorption drier system, and a device having an in-service testing device in a processor-controlled adsorption drier system in which regeneration is performed by a flow of regeneration gas.

Adsorption fractionation is used in particular when drying compressed air. Compressed air is the energy medium used in production processes. Modern production methods and processing operations are placing ever higher demands on the requirements for compressed air. These days, it is no longer sufficient to provide a specified quantity of compressed air since the compressed air must also conform to specified purity criteria. That being the case, the need to be able to produce dry, clean compressed air has assumed a certain amount of importance. In the case of adsorption fractionation, water molecules from the air tend to adhere to an adsorbent.

A device for adsorption fractionation is described, for example, in a document entitled "Trockene Druckluft. Mit Sicherheit ein reiner Gewinn", published by Ultrafilter GmbH, Büssingstraβe, D-42781 Haan, Germany, and in an English language version entitled "Dry Compressed Air The Cleanest Solution—Guaranteed" published by Ultrafilter International. The German language document is known by reference T.997.004.03.D 10.95 and the English language document is known by reference T 997.005 03 GB/D 6/96. With that device, it is possible to dry compressed air on a continuous basis. To that end, the device has two containers filled with adsorbent. When the device is operating, moist air is circulated through one of the containers, where it is dried accordingly, while some of the dried air is simultaneously fed into the other container where the adsorbent is regenerated in a direction opposite that of the flow, i.e. it picks up water molecules from the adsorbent. The air which is moistened again in that way is expanded during regeneration and discharged to the ambient environment.

Another device used for adsorption fractionation with gases is described in European Patent Application 0 168 336 A2, corresponding to U.S. Pat. No. 4,631,073. That publication contains a wealth of information giving details of the adsorption technique and some relating to process control.

The set-up costs for building such devices represent a considerable proportion of the costs involved. Accordingly, they will depend on the cost of the number of individual components to be assembled and the cost of manufacturing them. Furthermore, additional costs are also incurred if in-service testing has to be conducted on the device through the use of a function monitoring system. The components needed for that purpose also have to be mounted on the system, which means that the number of components will essentially depend on the type of in-service testing being used. Various techniques used for that purpose are known from the prior art, some more complex than others, and are configured to meet certain safety specifications.

A sampling device is known from U.S. Pat. No. 4,127,395, through the use of which a moisture sensor can be tested for operating capability. If an indicator shows that the moisture sensor has failed, the adsorption drier system can be automatically switched to time-controlled operation. Operation of that sampling device requires several additional lines to be run to the adsorption drier system. Another device is disclosed in U.S. Pat. No. 4,504,286, along with a method for controlling the switching function between two containers of adsorbent, whereby switching still continues even if the actual moisture monitoring function fails. That is a processor-controlled system which compares the maximum storage capacity of a bed of adsorbent with the time integer of the water flowing through it. A moisture analyzer is used in conjunction with other components to measure the proportion of water being circulated.

In practice, it has often been found while maintenance work is being carried out on supposed disruptions in the adsorption drier system, that it is necessary to check if the regeneration air is being discharged from alternating sides, either acoustically or by observing two manometers mounted on the containers for the adsorbents. Possible sources of failure in that area are the shuttle valves, discharge valves and overflow passages for regeneration air. However, it is not possible to give a more accurate plant-related diagnosis of the fault or even the source of the fault, particularly in older adsorption drier systems. Consequently, because of the type of testing, suspected disruptions in the adsorption drier plant are not further investigated unless there has already been a perceptible degradation in the quality of the compressed air being delivered.

SUMMARY OF THE INVENTION

It is accordingly an object of the invention to overcome the hereinafore-mentioned disadvantages of the heretofore-known methods and devices of this general type and to provide a device for operating a continuous process of adsorption fractionation for a gas, which is low in terms of manufacturing and assembly requirements and in particular enables integration of a safe in-service testing system that does not impose any significant additional requirements. The intention is also to provide an in-service testing device requiring few components and therefore having a low requirement in terms of manufacturing and assembly so that it can be integrated in a continuous adsorption fractionation device at a low cost. Another objective of the invention is to provide a method for safely testing the operating capability of an adsorption drier plant which can also be retrofitted, without incurring costs that are too excessive, on a continuous adsorption fractionation device and in particular one which can be integrated in order to ensure that in-service testing is highly reliable. In particular, the device, the in-service testing device and the method are intended to be so adapted to one another that their respective advantages in terms of low component requirements and manufacturing input can be judiciously combined with one another.

With the foregoing and other objects in view there is provided, in accordance with the invention, a device for continuously fractionating a gas by adsorption, in particular for drying or cleaning air, comprising at least one pair of containers including a first and a second container; a first shuttle valve and a second shuttle valve; a common gas inlet branching off through the first shuttle valve to the two containers; a common gas outlet branching off through the second shuttle valve to the two containers; a bypass line connecting the two containers in the vicinity of the gas outlet; a bypass outlet connected to the two containers in the vicinity of the gas inlet for individually shutting off the two containers; in order to increase the number of containers, at least one extruded container body is provided having mutually spaced apart outer surfaces, each container body having at least one container cavity and each container body having at least one line cavity, the at least one container cavity having two cavity openings in the outer surfaces; and a common pre-fabricated functional block into which the gas inlet, the gas outlet and the bypass outlet feed, the gas inlet and the gas outlet to and from the containers, the first and second shuttle valves and other components forming a line switching circuit integrated in the functional block.

The functional block may be pre-fabricated in a factory and tested so that no assembly steps or final assembly of the device will be required at the operating site. Desired ranges for a measurement value to be applied to a method of in-service testing can also be stored in it beforehand.

One advantage of the present invention is that the same functional blocks with differing layouts of containers relative to devices can be combined. For example, it is possible to set up combinations with low or high containers and with only two or with twenty containers. Functional blocks for devices can therefore be produced beforehand and kept in storage. Any appropriate control system can be individually set up by programming and processor selection but, because the functional block is standard, it can also be standardized to a basic set-up. Standardization of this type is made possible by integrating components of the control system in the device in such a way that no other extra components will be needed for this purpose.

In order to operate a continuous adsorption fractionation process, at least one pair of containers is used containing adsorbent, namely a first and a second container. In specific embodiments of the devices, additional containers filled with adsorbent are also used. The number of containers used is mostly an even number. However, in specific embodiments, it is also possible to use odd numbers of containers.

The first and the second containers have a common gas inlet branching off through a first shuttle valve and a common gas outlet branching off through a second shuttle valve, the two containers being connected through the use of a bypass line in the region of the gas outlet. The two containers can be individually shut off in the region of the gas outlet but are connected to a bypass outlet.

In a preferred embodiment of the device, the gas outlet and the bypass outlet are connected to one another, the bypass outlet being branched so that a respective branch feeds into the first and into the second container. The gas inlet and the bypass outlet use common line components so that the first and the second container each have only one connection common to the bypass outlet and the gas outlet. Other embodiments have a plurality of connections to the containers for the bypass outlet and gas outlet. Disposed on each of the two branches of the bypass connection is a check valve for shutting off the containers individually. In another variant of these embodiments, three-way valves are used, for example on a branch line into the bypass outlet.

In accordance with another feature of the invention, there is provided an upstream filter in the gas inlet and/or a downstream filter in the gas outlet. By preference, the upstream filter and the downstream filter are placed in a manifold in the gas inlet and the gas outlet, so that the manifold branches off in a direction towards the two containers. Other embodiments have several upstream filters and downstream filters connected in series and/or in parallel and at various points in the gas inlet and gas outlet.

By preference, a differential pressure meter is disposed between the filters, which will provide an indication of the operating status of the system. The differential pressure can be obtained by taking a pressure measurement in the respective manifolds. However, in order to take advantage of the compactness of the plant, the differential pressure meter will be specifically disposed in the functional block so that it co-operates directly with a board, in particular a valve control board. Accordingly, a differential pressure meter might have, for example, a magnet which is slidable depending on the differential pressure that directly influences a magnetic sensor on a board. Capacitively coupled systems may also be used. This obviates the need for additional power lines to transmit impulses representing the measured differential pressure and reduces assembly requirements in the functional block. The system of directly acting on the board enables the electric signals there to be converted and further processed in components that are also integrated in or connected to the functional block. The differential pressure meter could also be used as a measurement value emitter as part of a control system, as will be explained in more detail below.

In the region of the gas outlet, the two containers are connected to one another through the use of a bypass line. In one advantageous embodiment, connections of the bypass line co-operate with line sections of the gas outlet. In another variant of this embodiment, the first and/or the second container has a bypass connection disposed at a distance from the gas outlet, although the bypass connection is close to the gas outlet in spatial terms.

In accordance with a further feature of the invention, the functional block contains a function control system, which takes over process control tasks during operation of the device, for example valve control. This can then also be used for the method of processor-controlled monitoring of the operating capability of the device. In particular, the components required for this control system can be integrated in the functional block requiring no additional housing.

In accordance with an added feature of the invention, the functional block has a gas inlet port. The gas inlet port is connected through a connecting line disposed in the functional block to an upstream filter mounted on the functional block. In another embodiment, the functional block has instead or in addition a gas outlet port which is connected through a connecting line disposed in the functional block to a downstream filter mounted on the functional block. For practical purposes, the upstream filter and the downstream filter are mounted on the functional block.

In accordance with an additional feature of the invention, there are provided an upstream filter and a downstream filter attached to two opposite outer surfaces of the functional block. The upstream filter is preferably underneath and the downstream filter on top of the functional block.

In accordance with yet another feature of the invention, in devices which have at least one of the filters, it is of advantage if the filter is connected to a filter residue discharge line feeding into the functional block. Accordingly, filter residues, for example oil or water, can be fed away.

In accordance with yet a further feature of the invention, the functional block contains a discharge device that can be shut off, to which the filter residue line can be connected. Practical variants of this embodiment have a check valve which can be controlled by a function control system. In addition, it is also useful to use filter residue manifolds, which are connected to the filter residue discharge line at the filter and/or at the functional block.

In accordance with yet an added feature of the invention, as described above, the functional block incorporates lines or line sections and it is advantageous if the functional block has at least one molded passage component with passage-like recesses. Lines can be set up in a passage-type configuration by using a molded passage component of this type or by using several of these molded passage components in conjunction with one another. Molded passage components are inexpensive to manufacture and can be made by using an injection molding process, for example. In other different embodiments, one or more lines can be set up wholly or partly by using these molded passage components. Of particular advantage is a molded passage component having a passage branch, at which the molded passage component will have a recess for seating a valve, in particular a shuttle valve. This being the case, the measurement sensors or receivers or the sensor or sensors needed for receiving a measurement value or operating parameter can be integrated in these lines. This might be provided in the form of a sensor, for example, which measures the volume of air flow. However, a sensor of this type may also be located at a different point, for example on the gas inlet port. Preferred embodiments are those in which the molded passage component has at least two passages that are not connected to one another inside the molded passage component. Integrating several lines or line sections in one component in this manner simplifies manufacture and assembly of the device significantly. Some practical embodiments have additional recesses in the molded component, e.g. for receiving or mounting a function control system, operator and indicator units and/or parts of a filter.

In one advantageous embodiment of the device, the first and/or the second shuttle valves are passive shuttle valves, and the status of these valves is determined by the pressure conditions at the valve. Passive shuttle valves do not require any valve control, which makes control of the device simpler. For practical purposes, the first and/or the second shuttle valves are disposed on the branch of a manifold line and simultaneously allow a gas to flow from the manifold line into only a part of the branch lines. The lines are a suitable position for mounting the measurement sensors or receivers.

In accordance with yet an additional feature of the invention, the two containers can be shut off from an output of the bypass outlet which is disposed at a distance, by one electronically controllable outlet valve or preferably by one for each container. Either option will enable the device to be operated by a centralized electronic control, for example. It is of advantage if the electronically controllable outlet valve or valves have an electronic unit, which is mounted on the outlet valve or valves. The valve or valves will therefore act as a mounting device for the electronic unit.

The valves themselves will usually be mounted on a line or line components by a permanent mounting. There are therefore no additional fitting requirements for the electronic unit. The lines co-operating with the bypass outlet represent another suitable point for mounting the measurement sensors or receivers.

Another option for controlling operation is to use, in addition, measurement values taken from the lines of the bypass outlets and their or other outlet openings and lines, e.g. a gas outlet port. If mass flow sensors are installed, the throughput can be measured. It will be possible to derive the pressure therefrom if the functional correlation between pressure and mass flow is known for the operating status of the plant. This functional correlation will more or less be a constant at constant temperature, for example, which is preferably retrieved from a memory unit, for example. If the mass flow becomes lower, then the pressure will also drop and, upon exceeding a specific limit, a signal could be triggered accordingly, to indicate that a filter-change is needed, for example.

Monitoring the pressure will mean that the functioning of the plant can be monitored, for example to ascertain whether or not switching between two containers was performed without fault. If a valve only opens or shuts partially, function monitoring of this type will be able to ascertain that a fault has occurred due to the fact that the mass flow is lower than expected and if several sensors are used it should also be possible to locate the site of the fault. This function monitoring can therefore be used as a stand-alone, independent monitoring system which can also be retro-fitted on an outlet orifice for a mass flow flowing out from the system, provided it is not integrated at that point or in one of the connected lines. A preferred application for this function monitoring system is in smaller systems having two containers with a small structure, such as might be used in a dental practice, for example.

In another embodiment of the device, the functional block has at least one indicator unit on an external surface, e.g. from which a reading of the valve status or a gas pressure value can be taken. During operation of the device, valve status can provide valuable information about the overall operating status, e.g. in which container gas is currently being dried and in which container adsorbent is currently being regenerated. A gas pressure value, particularly a pressure differential, can provide even more operating information. If an upstream and/or a downstream filter is provided, a difference in pressure between two filter ports may indicate whether or not a filtering medium needs to be changed. The operating values obtained in this manner can also be used as operating parameters for the purpose of selecting a predeterminable desired range.

In accordance with again another feature of the invention, at least one pair of containers is connected to the functional block across a system of four bus lines. The bus lines are bundled or separated from one another. Two bus lines form part of the gas inlet, the other two form part of the gas outlet, one of each is connected to the first container and the other of each is connected to the second container. In embodiments including more containers, these containers will also be connected into the system.

For practical purposes, the device is constructed in such a way that it has at least one container body, each of which will have at least one container cavity and each of which will have at least one line cavity. Two cavity openings are provided in external surfaces of the container body that are spaced at a distance apart from one another. A compact structure such as this makes it easier to change the adsorbent, particularly if the adsorbent is supplied in cartridges. The line cavity is used to connect the container cavity to the functional block. In one embodiment including a system of four bus lines and one container body with line cavities, connections are provided between the bus lines and corresponding line cavities. The connections are made by boring, cutting or punching the container body, for example.

In general, each container cavity has at least two line cavities. In a preferred embodiment, one line cavity is gas-tight and is divided into two compartments through the use of a gas barrier, with each compartment extending from the gas barrier to a cavity opening. As a result, it is necessary to provide only one divided line cavity for each container cavity.

In order to reduce manufacturing costs, amongst other reasons, it is an advantage if the container body is made by extrusion.

In another embodiment, the container body has two container cavities and two line cavities, both being divided through the use of a gas barrier as described above. The four compartments extend longitudinally and approximately parallel with one another. This embodiment offers a high capacity for integrating components, thereby reducing the cost of manufacturing the device proposed by the invention.

It is of practical use if the device has a cavity link in the external surfaces of the container body which are spaced apart from one another, preferably a cavity link at each of the two spaced apart external surfaces. The cavity link connects the container cavity, of which there is at least one, to a line cavity. A modular structure of this type for setting up and connecting containers offers advantages from a manufacturing point of view.

A particularly practical configuration is one in which the cavity link is a closure device, e.g., a lid or a base, on the container cavity opening, to provide a gas-tight seal against the ambient environment of the container. Consequently, no additional closure component will be required.

Also of advantage is an embodiment in which the cavity link is a base bearing the weight of the container body.

Another underlying principle of the invention is a method for processor-controlled monitoring of the functional capability of an adsorption drier plant having two adsorbent beds connected to one another by a switching system, whereby a first and a second adsorbent bed can each be switched alternately from a regeneration phase to an adsorption phase and vice versa, so that the regeneration is effected across a flow of regeneration gas.

With the objects of the invention in view there is accordingly provided a method for continuous adsorption fractionation with processor-controlled testing of an operating capability of an adsorption drier system, in which regeneration is performed by a flow of regeneration gas, which comprises recording a measured value functionally correlated to a flow of regeneration gas; performing a comparison under control of the processor to ascertain if the measured value falls within a predeterminable desired range for the measured value; and triggering a signal if a measured value lies outside the desired range.

This method requires only a few components, which can be specifically integrated in a device of the type described above, taking advantage of the compactness of the functional block, without the need to build any additional components into the device. However, this method can also be used on existing adsorption drier plants and, because of the parts likely to be contained therein, obviates the need to resort to yet other components. Otherwise, the method can also be applied by using a retro-fittable in-service monitoring device as will be described in more detail below.

The method is based on the functional correlation of the measured value to the flow of regeneration gas, occurring across a flow volume, a pressure or even across a mass flow if the density is known. All variables which can be correlated back to the flow of regeneration gas are reliable. The measurement value can be recorded through the use of a combined measurement, for example of pressure and temperature or of flow volume and temperature. The predeterminable desired range then sets a maximum and a minimum value which form the limits of the desired range. It is also possible for the desired range to be produced by specifying a single maximum or minimum value. The processor-controlled comparison will ascertain whether or not the measured value lies within the limits. Allowing the processor to assume the comparison function offers the option of being able to pick up immediately on any faulty function occurring when a measured value falls outside the desired range. This means that any fault occurring while regenerating an adsorbent bed in the adsorption drier system can be picked up quickly.

Recording a measured value that is functionally correlated to the flow of regeneration gas means that the components needed to implement the method can be readily integrated within an adsorption drier system. The method can also be used in conjunction with an existing adsorption drier system without having to make too many modifications to the existing plant.

In accordance with another mode of the invention, the measured value being recorded is correlated to a flow of adsorption gas and the value for the flow of regeneration gas is derived therefrom. This can be done by recording a measurement value downstream of an overflow passage for the regeneration gas flow, as seen in the direction of flow from the first to the second adsorbent bed. Through the use of the flow of adsorption gas that is present, measured as a flow volume, for example, it is possible to track back from predetermined switch positions of valves and/or the operating status of the adsorption drier plant, to the value of the regeneration gas flow in the overflow passage. This being the case, one option is to use as an aid a flow of gas flowing into the adsorption drier plant having characteristics which are known.

In accordance with a further mode of the invention, it is possible to pick up on a faulty function when switching the throughput between the two adsorbent beds if the measurement value and/or the change of the measurement value over time is recorded in relation to the timing of a valve of the adsorption drier system as it opens or closes. Correlated on a time basis, this can mean that the measurement value can be specifically recorded shortly prior to opening, during opening and/or after opening and closing of the valve. In another embodiment, the method is also set up so that the processor issues a first signal to open and/or close a valve, upon which the throughput of regeneration gas through the first or second adsorbent bed is permitted or prevented, and a second signal for recording the measurement value. This produces a time correlation which can be correlated back to the operating mode of the valve, for example. Depending on the response time needed, there is also the option of linking back from the recorded values to a special memory source. Since the measurement value is recorded and further processed through the use of the processor, the overall method of processor-controlled monitoring of operating capability in the adsorption drier system can be automated. The measurement values can be recorded on a continuous basis and/or at intervals, depending on the type of adsorption drier plant, e.g. depending on how the plant is operated. In one embodiment, the measurement value is not only recorded on the basis of a time correlation with the opening and closing of a valve of the adsorption drier system, but also during the entire operation. Consequently, disruptions will be perceptible, as in the case of a blocked line, for example. Continuous measurement recording will provide information about functional capability at any time. Periodic measurement recording will in turn monitor the degree to which the system is still capable of operating. This will be done at intervals of time, which will be fixed or predetermined by a random generator. It is particularly well suited to continuously monitoring the operation of adsorption drier systems which are only susceptible to slight changes. The primary advantage of this is that the processor can process other functions simultaneously, for example recording and processing other measured values.

In accordance with an added mode of the invention, a first and a second measurement value are recorded in succession, wherein the second measured value is based on at least one parameter which varies relative to the first measured value. Functional testing is then undertaken on the basis of the function linking the first measured value, the second measured value and the parameter.

If the flow volume is recorded, this value will be particularly well suited to conducting measurements on a heated component that is cooled by the flow of regeneration gas. Instead of measuring temperature, it is also possible to measure a temperature-dependent resistance of a component cooled by the flow of regeneration gas.

In accordance with an additional mode of the invention, the predeterminable desired range for the measurement value is stored in memory. This is preferably effected as a function of at least one operating parameter of the adsorption drier system. The storage system enables operation of the adsorption drier system to be activated at any time without the need for a lengthy procedure beforehand to enter the values required for the desired range. One advantageous embodiment offers the option of selecting one of a number of desired ranges from memory depending on the operating parameter by linking the desired range to at least one operating parameter of the adsorption drier system. This ensures that even if operating conditions vary, the adsorption drier system can always be guaranteed to operate safely. In another embodiment of the method, it is also possible for an operator to select the desired range manually. He or she will determine the operating parameters beforehand accordingly, for example the operating pressure or throughput quantities.

In accordance with yet another mode of the invention, the operating parameter corresponding to the measurement value is also recorded through the use of at least one sensor, at least during operation of the adsorption drier system. Advantageously, this is effected at least more or less simultaneously. In adsorption drier systems which are run on the basis of frequently or constantly changing operating parameters, using a sensor to record at least one operating parameter will ensure that the operator is in a position to run the adsorption drier system easily and without complications, without having to pay attention to settings such as the predeterminable desired range.

In accordance with yet a further mode of the invention, if the desired range pertaining to the operating parameter is selected under the control of the processor, the method of monitoring the operating capability can be automated to such an extent that the adsorption drier system will run virtually on the basis of characteristic indicators. The selected desired range is checked at least from time to time and adjusted if necessary. This takes place while the adsorption drier system is operating but can also be performed in phases when the adsorption drier system is in a run-up mode.

In accordance with yet an added mode of the invention, if a measured value falls outside the desired range of variances determined by the processor, for example, a source of the fault is closed down. The predeterminable variations can be pre-set beforehand at the manufacturing stage, in the same way as the desired ranges stored in memory. Depending on the nature of the variance, it will then be possible to conclude if a valve is jammed and is not opening or closing. For example, on one hand, it will mean that the flow of regeneration gas is too small if a valve is not opening sufficiently or the overflow passage is blocked. On the other hand, the flow of regeneration gas will be too high if a valve is not closing correctly under certain circumstances.

In accordance with yet an additional mode of the invention, the measurement values are recorded and stored, their timing sequence analyzed, and on this basis conclusions about the behavior of the adsorption drier system can be drawn in the future. Some sources of fault do not occur suddenly but become apparent gradually. Very often, this might be due to a build-up of particles in passages which will eventually lead to blockages. However, evidence of wear caused by friction will also become noticeable if an appropriate evaluation of slowly changing measured values is performed.

In accordance with again another mode of the invention, if a measured value is found to be outside the desired range, not only is a fault signal triggered, but an adjustment is also made to an operating parameter of the adsorption drier system, an adsorption and/or regeneration time for the first and/or the second adsorbent bed. In this manner, the processor switches from the previous, standard control to a newly adjusted control. The quality of the gas flow can be guaranteed as a result even if a fault has occurred. Accordingly, an emergency operating program is provided to ensure continued operation in spite of a functional fault until it is possible to remedy the fault. This is of particular advantage in adsorption drier systems which cannot be repaired until an engineer arrives. This is very frequently the case with small adsorption drier systems in particular, such as those which would be used by dental practitioners, for example. The method of monitoring the operating capability of an adsorption drier system has proved to be extremely useful in the case of such small adsorption drier systems.

By virtue of another principle of the invention, an in-service testing device for a processor-controlled adsorption drier system is also provided, having a first and a second adsorbent bed which can be alternately switched between regeneration and adsorption mode so that regeneration can be performed through the use of a flow of regeneration gas.

With the objects of the invention in view there is accordingly provided a device having an in-service testing device in a processor-controlled adsorption drier system performing regeneration by a flow of regeneration gas, comprising at least one measurement sensor for recording a measurement value functionally dependent on a flow of regeneration gas and for supplying a measured value signal; a processor for recording and further processing the measured value signal from the at least measurement sensor; a memory unit for storing at least one desired range for the measured value; the processor and the memory unit connected to one another for enabling a comparison to be made between the measured value and the at least one desired range; and a display connected to the processor for responding through the processor if a measured value falls outside the desired range.

The measurement sensor is advantageously disposed in an overflow passage, through which the flow of regeneration gas can be branched off from the gas flow dried by the first adsorbent bed and fed to the second adsorbent bed. Furthermore, the measurement sensor can also be disposed in a line which is at least part of a connection between the first or the second adsorbent bed and the ambient atmosphere around the adsorption drier system. Another option for positioning a measurement sensor is to place it in a line through which a gas flow that has been dried by the first adsorbent bed is fed after being branched off from the flow of regeneration gas into the overflow passage to the second adsorbent bed. If retrofitted, the measurement sensor may also be mounted on a corresponding gas outlet so that no major modifications will be needed. To this end, the requisite components of the in-service testing device which need to be retrofitted are contained in a housing that is connected to the gas outlet.

In accordance with another feature of the invention, a flow volume measuring device or a pressure sensor can be used as the measurement sensors. A pressure sensor mounted in the vicinity of a valve can be used as a throttle. Once the pressure has been ascertained, it will then be possible to work back to the volume flow.

In accordance with a further feature of the invention, the adsorption drier system also has a processor advantageously having a control system for the adsorption drier system which responds to a measured value outside the predeterminable desired range for the measured value. A response is possible in the same manner as described above with respect to the preceding method.

In accordance with an added feature of the invention, in order to be able to adapt the control system of the adsorption drier system through the use of the processor specifically to the operation, the adsorption drier system has a sensor for recording an operating parameter and the sensor has a connection to the processor and/or to the memory unit. This being the case, the desired range can be applied to one or more operating parameters in a functional correlation.

In accordance with a concomitant feature of the invention, the memory unit has a connection to an input unit for storing desired ranges dependent on at least one operating parameter of the adsorption drier system. This enables characteristic indicators to be entered at the manufacturing stage so that they cannot be subsequently inadvertently altered during operation. The connection also makes it possible not only to enter data thereby but also to generate a data output. This then offers the option of recording data which can be used for the purposes of maintenance work and accordingly can be used to assess the technical status of the adsorption drier system. This provides the possibility of being able to recognize operating faults very quickly, even in the early stages. In particular, the adsorption drier system has a control with a control program, which is set up by using a method such as described above.

The method of testing the operating capability of an adsorption drier system under the control of a processor and the processor-controlled adsorption drier system are particularly well suited to applications requiring smaller, compact devices but are also suitable for larger systems that are required, for example, in air compression plants for compressed air circuits in large companies or sections of plants. An advantageous application of the invention will be described below in relation to an adsorption drier system having a particularly compact structure.

Other features which are considered as characteristic for the invention are set forth in the appended claims.

Although the invention is illustrated and described herein as embodied in a device and a method for continuously fractionating a gas by adsorption and an in-service testing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
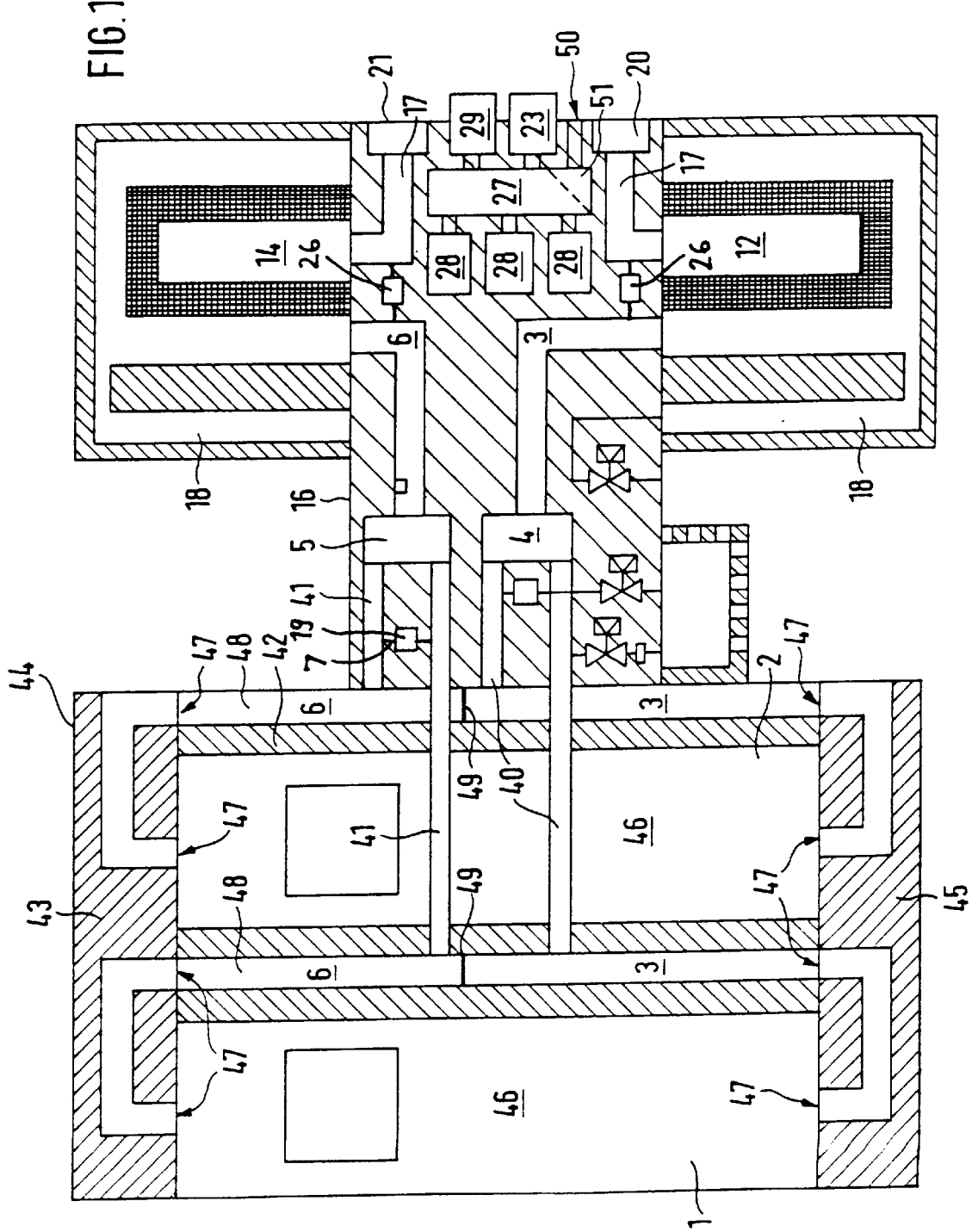
FIG. 1 is a diagrammatic, sectional view of an embodiment of a device having a functional block, to which an upstream filter and a downstream filter are attached and in which two containers with measurement sensors are integrated in the functional block.
Figure 2:
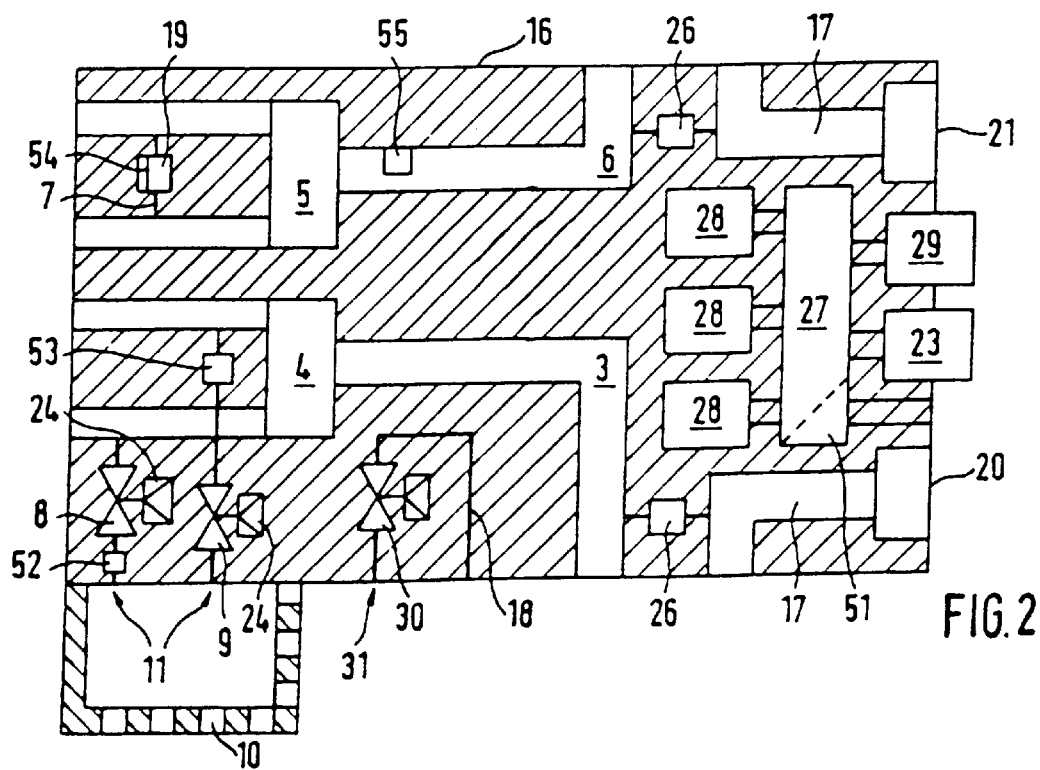
FIG. 2 is an enlarged view of the functional block illustrated in FIG. 1.

Referring now to the figures of the drawings in detail and first, particularly, to FIGS. 1 and 2 thereof, there is seen a preferred embodiment of a device according to the invention, having integrated testing for operating capability. Two container cavities 46 are disposed together, each having its own line cavity 48 in a container body 42. Each of the line cavities 48 are gas-tight and are divided into two compartments through the use of a gas barrier 49.

The container cavities 46 are connected to the line cavities 48 through the use of a cavity link 44 (top) on the outlet side and a cavity link 45 (bottom) on the inlet side. The connection is provided through the use of line sections, each being between cavity openings 47. The line sections in the cavity link 45 on the inlet side belong, together with two bottom compartments, inlet bus lines 40 and line sections in a functional block 16, to a gas inlet 3. The line sections in the cavity link 44 on the outlet side belong, together with two top compartments, outlet bus lines 41 and line sections in the functional block 16, to a gas outlet 6.

A container pair 43, which includes a first container 1 and a second container 2, that can be filled with an adsorbent bed, is disposed adjacent the functional block 16. The functional block 16 contains a first passive shuttle valve 4 in the gas inlet 3 and a second passive shuttle valve 5 in the gas outlet 6. The gas inlet 3 is connected to an upstream filter 12, which in turn has a connection through a connecting line 17 to a gas inlet port 20. The upstream filter 12 is also connected through a filter residue discharge line 18 to the functional block 16 and the filter residue discharge line 18 continues on into the functional block 16. A downstream filter 14 is connected to a line section of the gas outlet 6. The downstream filter 14 is connected through a connecting line 17 to a gas outlet port 21. The downstream filter 14 is also connected to a filter residue discharge line 18, but that line terminates at the functional block 16. That filter residue discharge line 18 is not used in this particular embodiment and exists purely for manufacturing reasons.

The functional block 16 has three solenoid valves 28 which are used to control three valves shown in the bottom left-hand part of the functional block 16. Connections to these valves are not illustrated in FIG. 1. The three solenoid valves are connected through the use of power lines to an electronic control system or unit 27, which in turn is connected to an operator unit 29 and a display unit 23. The electronic control system 27 is used as a processor for recording and processing a measured value signal. The display unit 23 responds through the electronic control system 27 if a measured value falls outside a desired range. Two power lines disposed underneath the display unit 23 run from the electronic control system 27 to power terminals 50 on the right-hand external surface of the functional block 16. The terminals 50 are used, on one hand, for control purposes and fault diagnosis, for example by a service engineer at the site of the device. The terminals 50 can be used, on the other hand, for entering data, in particular desired ranges, in a memory unit 51 or the electronic control system 27. Readings of key data pertaining to operating status can also be taken from the display unit 23. In a first embodiment, the latter will be able to indicate both fault-free and faulty operation. When a fault signal is triggered by a measured value falling outside the desired range, it is also possible to display the source of the fault. The operator unit 29 in turn enables direct manual operation of the device, such as switching on or shutting down or manual control of the valves in the functional block 16 or adjusting operating parameters or desired ranges.

The functions of the valves shown at the bottom left-hand part of the functional block 16 and other details of the functional block 16 will be described with reference to FIG. 2. A first outlet valve 8 is located in a branch of a bypass outlet 11, which connects the gas inlet 3 to a damper 10. The damper 10 is in turn connected to the ambient environment of the functional block 16. The first outlet valve 8 is provided as a diaphragm valve controlled with the aid of one of the solenoid valves 28. This being the case, a co-operating valve control board 24 is mounted on the valve 8. In one embodiment of the invention which provides particularly intensive monitoring, a first measurement sensor 52 is disposed between the bypass outlet 11 and the first outlet valve 8. This sensor measures the flow of volume flowing out as a regeneration flow after it has passed through the container 2, which is not illustrated in FIG. 2. A second outlet valve 9 is located in another branch of the bypass outlet 11, which connects the gas inlet 3 to the damper 10. The second outlet valve 9 is controlled by one of the other solenoid valves 28. A second measurement sensor 53, which is disposed between the second outlet valve 9 and the gas inlet 3, measures the flow of regeneration gas after it has passed through the container 1, which is not illustrated in FIG. 2. The requisite connection between the second measurement sensor 53 and the electronic control system 27 is shown in this case as being exactly the same as that provided for the first measurement sensor 52. Instead of taking a direct recording of the mass flow, another embodiment is provided in which the mass flow is measured indirectly on the basis of a pressure measurement recorded by the first and second measurement sensors 52, 53. The two measurement sensors are preferably integrated in the functional block 16 in such a way that they can be used to take a differential pressure reading. However, as an alternative, the two measurement sensors used for measuring the pressure differential may also be disposed on lines between the filters. In another embodiment, not illustrated herein, each of the flows of regeneration gas is fed, after the two outlet valves 8, 9, into a common bypass outlet, where it is measured. A discharge valve 30 is controlled by a further one of the solenoid valves 28. The discharge valve 30 allows filter residues to be discharged across the filter residue discharge line 18 from a discharge opening for filter residues 31. Two differential pressure sensors 26 are used to control a status of a filter medium in the filters 12, 14 illustrated in FIG. 1. If the pressure differential is too high, the pressure differential sensor 26 triggers a signal in the electronic control unit 27 to indicate that the filter medium needs to be changed. This information can also be provided in an external visual display through the use of lights of a light emitter diode in the display unit 23. In other variants of this embodiment, the data can also, instead or in addition, be displayed in another optically visual manner or indicated by an acoustic signal. Furthermore, the recorded pressure differential may also be used as an operating parameter. The pressure differential sensors 26 are incorporated in the functional block 16 in such a way that they operate the electronic control unit 27 or the valve control board 24 without contact in order to prevent line connections, in particular through corresponding magnets which slide depending on the pressure differential and a magnetic field sensor.

In the upper left-hand part of the drawing of FIG. 2, a bypass line 7 is provided as an overflow passage having a bypass throttle 19 disposed therein. In other variants of this embodiment, a throttle action of the bypass throttle can be controlled by the electronic control unit 27, for example, by varying an orifice cross-section in the bypass throttle 19. It is also possible to fit a measurement sensor on the bypass line 7 itself and in the bypass throttle 19. This option of a third measurement sensor 54 in the bypass throttle 19 is illustrated in FIG. 2. A fourth measurement sensor 55 is located in the gas outlet 6. These measurement sensors need not necessarily be provided simultaneously but demonstrate various possible points at which they can be built in to provide the sensor system. If it is known what the approximate flow volume of the regeneration gas should be due to the valve positioning and the operating parameters, it will be possible to draw conclusions about the operating capability of the functional block 16 from the volume of gas still flowing in the gas outlet 6 after the bypass line 7.

Figure 3:
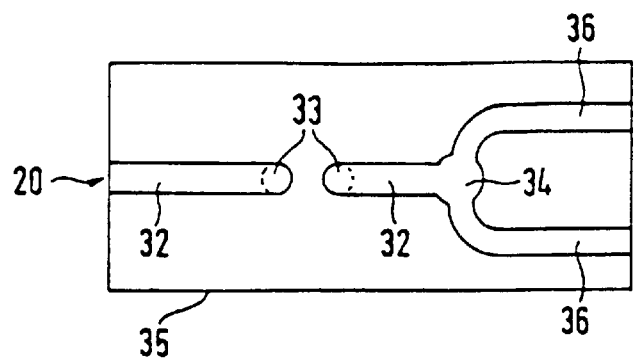
FIG. 3 is a plan view of a molded passage component.
Figure 4:
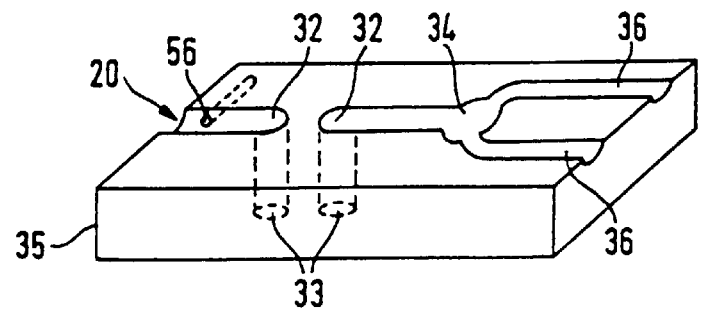
FIG. 4 is a perspective view of a molded passage component.

FIG. 3 and FIG. 4 show a molded passage component 35 having two main passages 32 which are not connected to one another inside the molded passage component. The molded passage component 35 also has two branch passages 36, a valve seat 34 and two filter ports 33. Each of the filter ports 33 is connected to a respective one of the two main passages 32 through the use of a continuous bore through the molded passage component 35.

The passages 32, 36 in the molded passage component 35 are completed by another, non-illustrated, molded passage component, or by a cover for connected gas line sections. The other molded passage component or the cover is disposed on a top surface of the molded passage component 35 illustrated in FIG. 4. However, various other molded passage components and/or covers may be used. Other components of the functional block may also be used as covers, e.g. a molded housing.

The molded passage component 35 is used to construct a gas inlet. When a device which is constructed in this manner is operating, gas flows from the gas inlet port 20, through the adjoining main passage 32, to the left-hand filter port 33. The gas flows through a non-illustrated filter, through the right-hand filter port 33, into the right-hand main passage 32. A shuttle valve inserted in the valve seat 34 determines the rest of the flow route. Accordingly, the gas will flow through either the front or the rear branch passage 36. The branch passages 36 are connected to the first and to the second containers. A sensor 56 is mounted in the vicinity of the gas inlet port 20 within the molded passage component 35, to log an operating parameter.

The embodiment of the device illustrated in FIG. 1 and in FIG. 2 is operated as follows: The gas to be fractionated flows through the gas inlet port 20. The gas flows across the bottom connecting line 17 to the upstream filter 12 and is fed back into the functional block 16. The valve status of the passive shuttle valves 4 and 5 will depend on the valve status of the active valves 8 and 9. One of the active valves 8 and 9 is closed and one of them is open simultaneously during operation. When the first outlet valve 8 is open, the first passive shuttle valve 4 is in a valve state in which the upstream filter 12 is shut off from the bottom one of the two inlet bus lines 40. The gas therefore flows out from the upstream filter 12, into the top inlet bus line 40 and from there downwards and through the cavity link 45 on the inlet side from underneath into the second container 2. The gas flows up through the latter, and as it does molecules of a fraction of the gas, e.g. water molecules, are retained on the adsorbent located in the container 2. The fractionated gas leaves the container 2 through the top cavity opening 47. The gas reaches the second passive shuttle valve 5, the valve state of which is such that the bottom outlet bus line 41 is shut off from the downstream filter 14. Consequently, the fractionated gas can continue to flow into the downstream filter 14 and leaves the device through the connecting line 17 at the gas outlet port 21.

However, not all of the fractionated gas is fed out of the device and a partial flow of the fractionated gas passes across the bypass line 7 and is fed through the bottom outlet bus line 41 from the top into the first container 1. The partial flow regenerates the adsorbent contained in the container 1 as it expands, picking up molecules from the gas fraction. The partial flow leaves the first container 1 through its bottom cavity opening 47 and flows through the open first outlet valve 8, the left-hand bypass outlet 11 and the damper 10 out of the device. After a certain time, the second outlet valve 9 is opened and the first outlet valve 8 is closed, upon which the first and second passive shuttle valves 4, 5 are switched. Consequently, the direction of flow in the two containers is reversed, so that the gas flowing into the device is fractionated in the first container 1 and the adsorbent in the second container 2 is regenerated with the aid of a partial flow of the fractionated gas.

Figure 5:
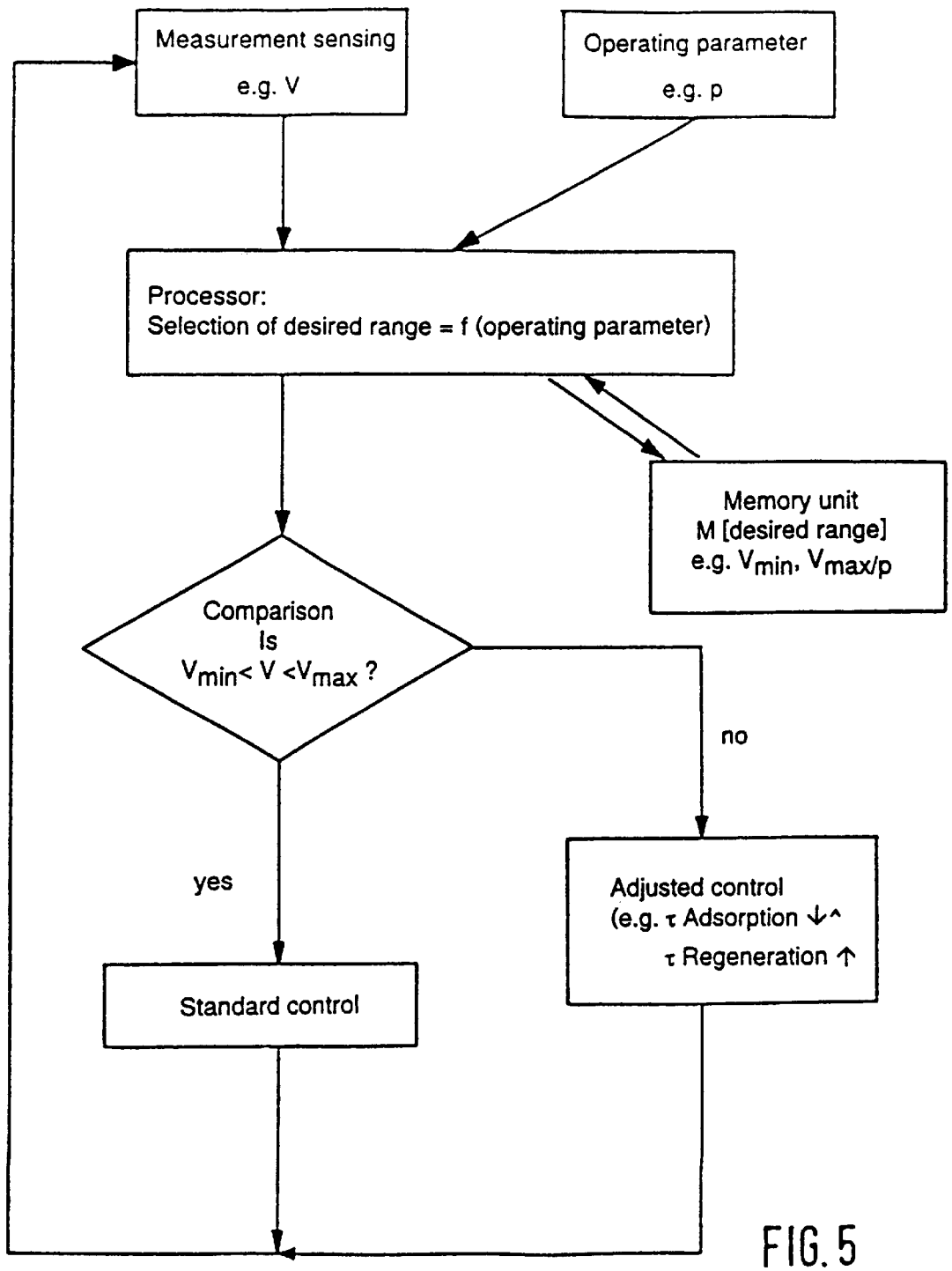
FIG. 5 is an operating diagram of a method for testing the device under the control of a processor.

FIG. 5 illustrates an operating diagram for a method of processor-controlled testing of the device. The measured flow volume d/dt V recorded by the measurement sensor and an operating parameter, for example the pressure p recorded by the sensor, are entered in the processor. Depending on the value of the operating parameter, a desired range is selected across the connection between the memory unit and the processor, which will specify upper and lower limits for the volume flow. A minimum volume flow d/dt $V_{min}$ may also have a value of 0. A comparison is then performed to ascertain whether or not the recorded, measured flow volume d/dt V falls within the desired range. In that comparison it will be decided whether the adsorption drier system should be operated under a standard control system or, if the prevailing flow volume falls outside the desired range, with an adjusted control system. If an adjusted control system is to be used, the adsorption time and/or the regeneration time will be adjusted, for example the adsorption time for an adsorbent bed will be reduced while simultaneously increasing the regeneration time thereof. A constant check as to the type of control system can be maintained through the use of the processor, by constantly repeating the recording of measured values and establishing the current operating parameters while selecting the corresponding desired range. In particular, this enables a regulating circuit to be set up, in which case not only is a fault indicated in the event of disruption but an appropriately modified operating mode is also guaranteed to be applied to the device.

A particularly compact embodiment of the adsorption drier system which is proposed by the invention and described in relation to the drawings, can be installed with very few assembly steps. Furthermore, it is built in such a way that, because of the compactness of the system, a function testing system can be integrated with very little modification to the requisite components. The adsorption drier system is preferably adapted to drying air and any operating fault can be detected rapidly. The invention is not specifically limited to smaller systems but is also generally suitable for testing the operating capability of a device for continuous adsorption fractionation of a gas. The description given above also explains how the in-service testing device proposed by the invention and the adsorption fractionation system are so compact due to their structures that they can be integrated with one another requiring very little space and very little effort in terms of assembly. The combination of the system, the in-service testing device and the method bring their respective advantages together, providing an extremely compact as well as clear adsorption drier system.

We claim:

1. A device for continuously fractionating a gas by adsorption, comprising:

at least one pair of containers including a first and a second container;

a first shuttle valve and a second shuttle valve;

a common gas inlet branching off through said first shuttle valve to said two containers;

a common gas outlet branching off through said second shuttle valve to said two containers;

a bypass line connecting said two containers in the vicinity of said gas outlet;

a bypass outlet connected to said two container s in the vicinity of said gas inlet for individually shutting off said two containers;

at least one extruded container body having mutually spaced apart outer surfaces, at least one container cavity and at least one line cavity, said at least one container cavity having two cavity openings in said outer surfaces; and a common pre-fabricated functional block into which said gas inlet, said gas outlet and said bypass outlet feed, said gas inlet and said gas outlet to and from said containers, said first and second shuttle valves and other components forming a line switching circuit integrated in said functional block.

2. The device according to claim 1, wherein said functional block contains a function control system.

3. The device according to claim 1, including an upstream filter mounted on said functional block, said functional block includes a gas inlet port, and a connecting line connects said gas inlet port to said upstream filter.

4. The device according to claim 3, including a downstream filter mounted on said functional block, said functional block includes a gas outlet port, and another connecting line connects said gas outlet port to said downstream filter.

5. The device according to claim 4, including at least one filter residue discharge line connected to at least one of said filters and feeding back to said functional block.

6. The device according to claim 5, wherein said functional block contains a discharge device to be shut off, and said at least one filter residue discharge line is connected to said discharge device.

7. The device according to claim 4, wherein said functional block has two opposite outer surfaces, and said upstream filter and said downstream filter are each mounted on a respective one of said outer surfaces.

8. The device according to claim 7, wherein said upstream filter is disposed underneath and said downstream filter is disposed on top of said functional block.

9. The device according to claim 1, wherein said functional block has at least one molded passage component with passages, said at least one molded passage component has at least one integrated measurement sensor, and said at least one measurement sensor operates without contacts.

10. The device according to claim 9, wherein said at least one measurement sensor operates with a movable magnet and a magnetic field sensor on a valve control board.

11. The device according to claim 10, wherein said measurement sensors and said valve control board are integrated in said at least one molded passage component opposite one another without contact.

12. The device according to claim 10, including a diaphragm valve, said valve control board connected in said at least one molded passage component for responding to said diaphragm valve.

13. The device according to claim 12, wherein said at least one diaphragm valve is integrated in said molded passage component.

14. The device according to claim 9, wherein said at least one measurement sensor is at least one differential pressure sensor.

15. The device according to claim 1, including at least two measurement sensors and three solenoid valves with a valve control board mounted thereon, said measurement sensors and said solenoid valves integrated in said functional block.

16. The device according to claim 1, including at least one electronically controllable outlet valve for shutting off at least one of said two containers from said bypass outlet in the vicinity of said gas inlet.

17. The device according to claim 16, wherein said at least one electronically controllable outlet valve has a valve control board mounted on said at least one outlet valve.

18. The device according to claim 1, including a system of four bus lines connecting said at least one pair of containers to said functional block, said four bus lines including a first two bus lines being part of said gas inlet and a second two bus lines being part of said gas outlet, one of said first and one of said second bus lines connected to said first container and another of said first and another of said second bus lines connected to said second container.

19. A device according to claim 1, having an in-service testing device in a processor-controlled adsorption drier system performing regeneration by a flow of regeneration gas, comprising:
at least one measurement sensor for recording a measurement value functionally dependent on a flow of regeneration gas and for supplying a measured value signal;
a processor for recording and further processing the measured value signal from said at least one measurement sensor;
a memory unit for storing at least one desired range for the measured value;
said processor and said memory unit connected to one another for enabling a comparison to be made between the measured value and the at least one desired range; and
a display connected to said processor for responding through said processor if a measured value falls outside the desired range.

20. The device having an in-service testing device in an adsorption drier system according to claim 19, wherein said at least one measurement sensor is at least one pressure sensor.

21. The device having an in-service testing device in an adsorption drier system according to claim 19, wherein said at least one measurement sensor is at least one mass flow sensor.

22. The device having an in-service testing device in an adsorption drier system according to claim 21, including an outlet, said at least one mass flow sensor disposed in the vicinity of said outlet.

23. The device having an in-service testing device in an adsorption drier system according to claim 19, wherein said processor has a control system for the adsorption drier system responding to a measured value outside the predeterminable desired range for the measured value.

24. The device having an in-service testing device in an adsorption drier system according to claim 19, including a sensor for recording an operating parameter, said sensor connected to at least one of said processor and said memory unit.

25. The device having an in-service testing device in an adsorption drier system according to claim 19, wherein said memory unit has a terminal for an input unit for storing desired ranges dependent on at least one operating parameter of the adsorption drier system.

26. An adsorption drier system according to claim 19, including an in-service testing device and wherein said at least one measurement sensor, said memory unit and said processor are integrated in said in-service testing device for continuously fractionating a gas by adsorption.

27. An adsorption drier system according to claim 19, including an in-service testing device and wherein the device for continuously fractionating a gas by adsorption is retrofitted on the adsorption drier system.

28. An adsorption drier system according to claim 19, including an in-service testing device and a control system that performs regeneration with a flow of regeneration gas, records a measured value functionally correlated to the flow of regeneration gas, compares and ascertains under control of the processor if the measured value falls within a predeterminable desired range for the measured value, and triggers a signal if the measured value lies outside the desired range.

29. A method for continuous adsorption fractionation with processor-controlled testing of an operating capability of an adsorption drier system, according to claim 19, in which regeneration is performed by a flow of regeneration gas, the method which comprises:
recording a measured value functionally correlated to a flow of regeneration gas;
performing a comparison under control of the processor to ascertain if the measured value falls within a predeterminable desired range for the measured value; and
triggering a signal if a measured value lies outside the desired range.

30. The method according to claim 29, which comprises functionally correlating the measured value to a flow of adsorption gas, from which a value of a related flow of regeneration gas is derived.

31. The method according to claim 30, which comprises recording at least one of the measured value and variations of the measured value over time in relation to timing of a valve of the adsorption drier system as it opens.

32. The method according to claim 29, which comprises recording a first and a second measured value in succession and correlating the measured values with one another, the second measured value representing at least one parameter varying relative to the first measured value.

33. The method according to claim 32, which comprises performing a function test on the basis of a function correlating the first measured value, the second measured value and the at least one parameter.

34. The method according to claim 29, which comprises storing the predeterminable desired range for the measured value.

35. The method according to claim 34, which comprises recording the operating parameter with at least one sensor at least during operation of the adsorption drier system.

36. The method according to claim 34, which comprises selecting the desired range relating to the operating parameter under control of the processor.

37. The method according to claim 36, which comprises testing the selection from time to time during operation of the adsorption drier system and adjusting the selection if necessary.

38. The method according to claim 29, which comprises storing the predeterminable desired range for the measured value as a function of at least one operating parameter of the adsorption drier system.

39. The method according to claim 29, which comprises selecting the desired range from a number of stored desired ranges and making the desired range dependent on an operating parameter of the adsorption drier system.

40. The method according to claim 39, which comprises recording the operating parameter with at least one sensor at least during operation of the adsorption drier system.

41. The method according to claim 39, which comprises selecting the desired range relating to the operating parameter under control of the processor.

42. The method according to claim 41, which comprises testing the selection from time to time during operation of the adsorption drier system and adjusting the selection if necessary.

43. The method according to claim 29, which comprises diagnosing a source of a fault with the processor, if a measured value falls outside a desired range of predeterminable variances.

44. The method according to claim 29, which comprises analyzing and applying a timing sequence of the measured values to the behavior of the adsorption drier system in the future.

45. The method according to claim 29, which comprises adjusting at least one operating parameter of the adsorption drier system, and at least one of an adsorption and a regeneration time for at least one adsorption bed in at least one of the containers, if a measured value is outside the desired range.

46. The method according to claim 45, which comprises carrying out the adjusting step by correlating stored data from a matrix of historical values.

* * * * *